United States Patent [19]
Yamada

[11] Patent Number: 5,400,335
[45] Date of Patent: Mar. 21, 1995

[54] COMMUNICATIONS SYSTEM FOR AN ISDN AND A LAN, AND AN ISDN-LAN CONNECTION TERMINAL

[75] Inventor: Toshiaki Yamada, Yamato, Japan

[73] Assignee: Ricoh Company, Ltd., Tokyo, Japan

[21] Appl. No.: 873,196

[22] Filed: Apr. 24, 1992

[30] Foreign Application Priority Data

Apr. 25, 1991 [JP] Japan ............................. 3-094639

[51] Int. Cl.6 ............................................. H04J 3/24
[52] U.S. Cl. .................................. 370/94.1; 370/110.1
[58] Field of Search ............... 370/94.1, 58.1, 110.1, 370/58.2, 85.13, 85.4, 60; 358/442, 425, 61

[56] References Cited

U.S. PATENT DOCUMENTS

| | | | |
|---|---|---|---|
| 4,926,420 | 5/1990 | Shimizu | 370/94.1 |
| 4,930,123 | 5/1990 | Shimizu | 370/94.1 |
| 4,998,248 | 3/1991 | Matsuzaki | 370/94.1 |
| 5,051,992 | 9/1991 | Taniguchi et al. | 370/94.1 |
| 5,130,818 | 7/1992 | Tadokoro | 370/110.1 |
| 5,208,811 | 5/1993 | Kashio et al. | 370/110.1 |

Primary Examiner—Douglas W. Olms
Assistant Examiner—Ajit Patel
Attorney, Agent, or Firm—Oblon, Spivak, McClelland, Maier & Neustadt

[57] ABSTRACT

An ISDN-LAN connection terminal executes the communications control procedure of a D-channel protocol, and is connected with a LAN. An ISDN connection terminal specifies at least one of the LAN terminals by a sub-address or user-user information in a set up signal. The sub-address or the user-user information include an internet address, an electric mail address or a host name as identification information of the LAN terminal. The ISDN-LAN connection terminal transmits the data to the specified LAN terminal.

14 Claims, 8 Drawing Sheets

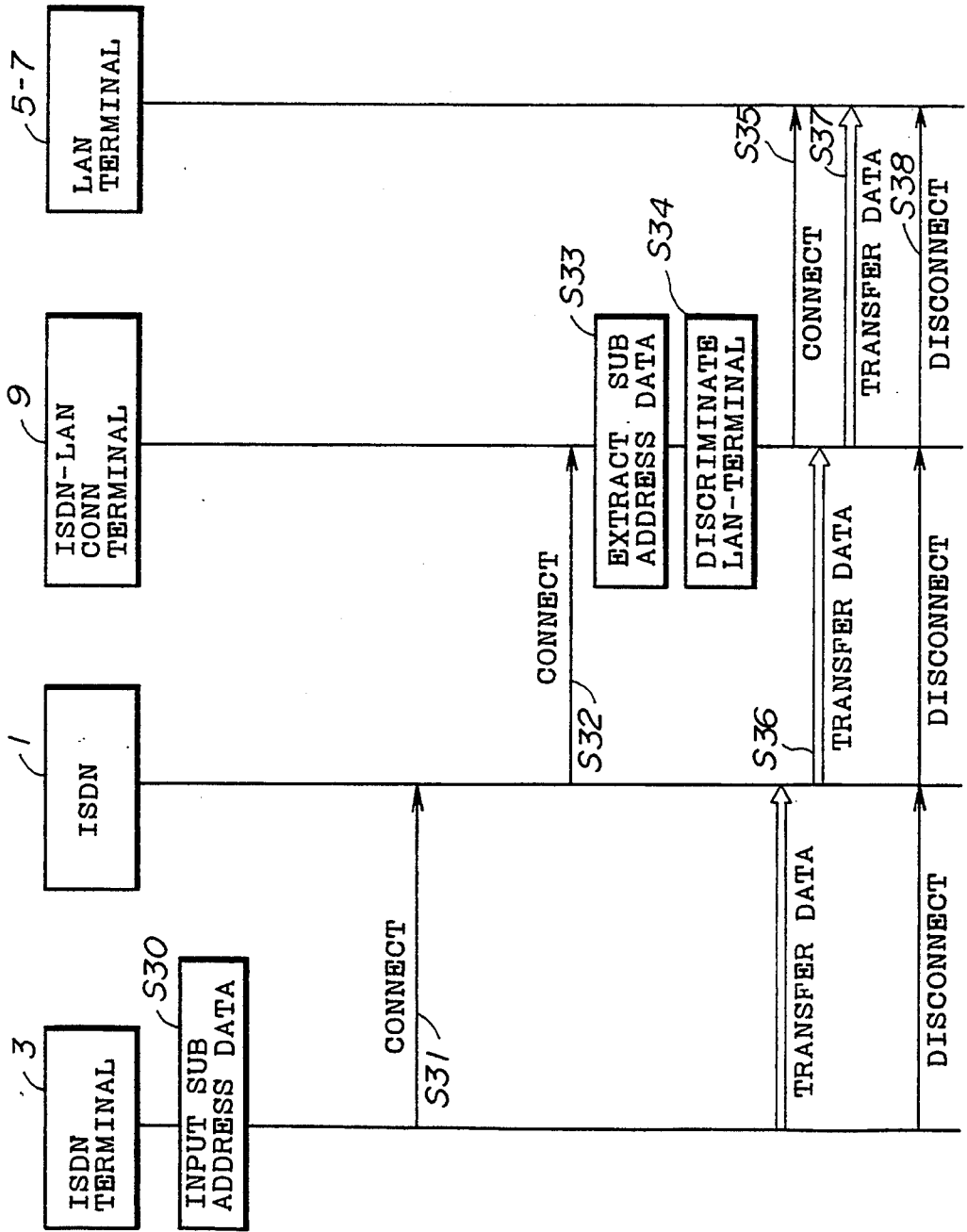

COMMUNICATIONS SYSTEM FOR AN ISDN AND A LAN, AND AN ISDN-LAN CONNECTION TERMINAL

BACKGROUND OF THE INVENTION

The present invention relates to a connection system for connecting an Integrated Services Digital Network (ISDN) and a Local Area Network (LAN) to each other, and more particularly, relates to a connection system for specifying a transmission destination terminal and connecting the ISDN terminal to the LAN terminal to each other when transmission is sent to an other party from a plural number of terminals which are respectively connected to the ISDN and the LAN.

DISCUSSION OF THE BACKGROUND

In recent years, the ISDN has been used as a communications network that digitalizes all information and alternates communications through unifying different services into the same communications network, and meets the communications needs of a sophisticated information society.

In addition to the above the increase in the use of computers, which have improved the productivity of offices and research laboratories, the number of computers at a location has increased. The LAN uses a single cable to connect work-stations, personal computers, host computers, file systems, printers and other input and output apparatus within a range of from 10 m to 10 km, and form a network which enables mutual communications between equipment. This LAN uses communications lines to mutually connect computers dispersed within a company and is used advantageously for the sharing of information within the same company.

The connection of the ISDN terminal and LAN terminals results in a network having a range and sophisticated information communications network services. For example, it is possible to provide sophisticated communications services between data terminals, facsimile apparatus and other communications terminals which are connected to the ISDN, and communications terminals such as computers and the like which are connected to the LAN.

However, to connect the ISDN and the LAN to each other, the communications terminals of the ISDN and those of the LAN must be first specified and accessed. However, since the contents of the information of the ISDN differ from those of the LAN when the respective communications terminals are specified, the communications terminals which are connected to the ISDN cannot specify the communications terminals which are connected to the LAN.

More specifically, ISDN number plans are specified, in accordance with a CCITT recommendation, by which the installed ISDN is allocated ISDN international numbers having a maximum number of 15 digits for each region and subscriber. In principle, one ISDN number is given to a D-channel on a user/network interface which houses a plural number of terminals, and when information is received from another ISDN terminal by an ISDN number, it is not possible for all terminals on the receive side to respond when functional correspondence has been achieved, and it is not possible to specify a specific terminal. Because of this, the ISDN specifies a specific terminal by predetermined ISDN numbers and sub-address which are determined so as to correspond to terminals between transmitting users and receiving users.

In addition, LAN number plans are regulated according to IEEE standards and specify a destination terminal for data by appending a 4-byte internet address and a 6-byte physical address (destination address) output from a LAN terminal.

In this manner, since ISDN and LAN have respectively different number plans, to connect the ISDN and the LAN to each other, it is necessary for the contents of the specified information of the ISDN terminals to correspond to those of the LAN terminal.

SUMMARY OF THE INVENTION

Accordingly, a general object of the present invention is to provide a novel and effective connection system for connecting the ISDN and the LAN to each other which eliminates the problems associated with the conventional system.

A more specific object of the present invention is to realize a system that appends identification information of a communications terminal which is connected to the LAN to user-user information or a sub-address which is used when the ISDN communications is controlled, and realizes a system where a LAN terminal can be specified by the ISDN terminal.

Another object of the present invention is to provide a communication system for ISDN and LAN, provided with; a communications system for an ISDN and a LAN, provided with; a connection apparatus, which is connected between a ISDN connected to a plurality of ISDN terminals and a LAN connected to a plurality of LAN terminals, connects a call connection between itself and the ISDN between itself and the LAN by a predetermined communication control procedure, then transmits data to at least of one the LAN terminals specified by the ISDN terminal, and comprising; a step for inputting identification information which specifies at least the one of the LAN terminals into ISDN communication control information as call connection information at the ISDN terminals; a step for transmitting the ISDN communications control information from the ISDN terminals to the ISDN; a step for transmitting the ISDN communications control information from the ISDN to the connection apparatus; a step for connecting the connection apparatus and at least the specified one of the LAN terminals corresponding to the identification information in the ISDN communications control information; a step for transmitting data from the ISDN terminal to at least the specified one of the LAN terminals via the ISDN, the connection apparatus and the LAN.

A further object of the present invention is to provide a communication system for ISDN and LAN, provided with; a communications system for an ISDN and a LAN, provided with; a connection apparatus which is connected between an ISDN connected to a plurality of ISDN terminals and a LAN connected to a plurality of LAN terminals, performs a call connection with said ISDN and the LAN by predetermined communication control procedure to each other, then transmits data to at least one of the LAN terminals specified by the ISDN terminal, and comprising; a step for inputting identification information which specifies at least the one of the LAN terminal into ISDN communication control information as a call connection information at the ISDN terminals; a step for transmitting the ISDN communications control information from the ISDN terminal to the ISDN; a step for transmitting the ISDN communications control information from the ISDN to the connection apparatus; a step for storing in a memory of the connection apparatus received data from the ISDN terminals via the ISDN; a step for connecting the connection apparatus and at least the specified one of the LAN terminals corresponding to the identification information in the ISDN communication control information; and a step for transmitting the data which is stored in the memory of the connection apparatus to the specified LAN terminal via the LAN.

Another object of the present invention is to provide An ISDN-LAN connection terminal apparatus comprising: an ISDN data communications procedure control means for specifying at least one LAN terminal corresponding to identification information in ISDN communications control information received from an ISDN terminal via an ISDN; a storage means for storing a data received from the ISDN terminal via the ISDN; an address storage means for previously storing an address corresponding to the identification information and a destination address of the specified LAN terminal; an address control means for referring to the address storage means and then searching the destination address of the specified LAN terminal corresponding to the identification information; a LAN data communications protocol control means for directly transmitting data which is transmitted from the ISDN terminal to the LAN terminal destination address searched by a predetermined communications control means.

BRIEF DESCRIPTION OF THE DRAWINGS

FIG. 3 is a sequence chart showing a communications sequence for the first connection process of the present invention according to a first embodiment thereof;

DETAILED DESCRIPTION OF THE PREFERRED EMBODIMENTS

A detailed description of the preferred embodiments of the present invention is given below, with reference to the appended drawings.

In a first embodiment of the present invention, specification of the LAN terminal by the ISDN terminal and the data is transmitted.

Figure 1:
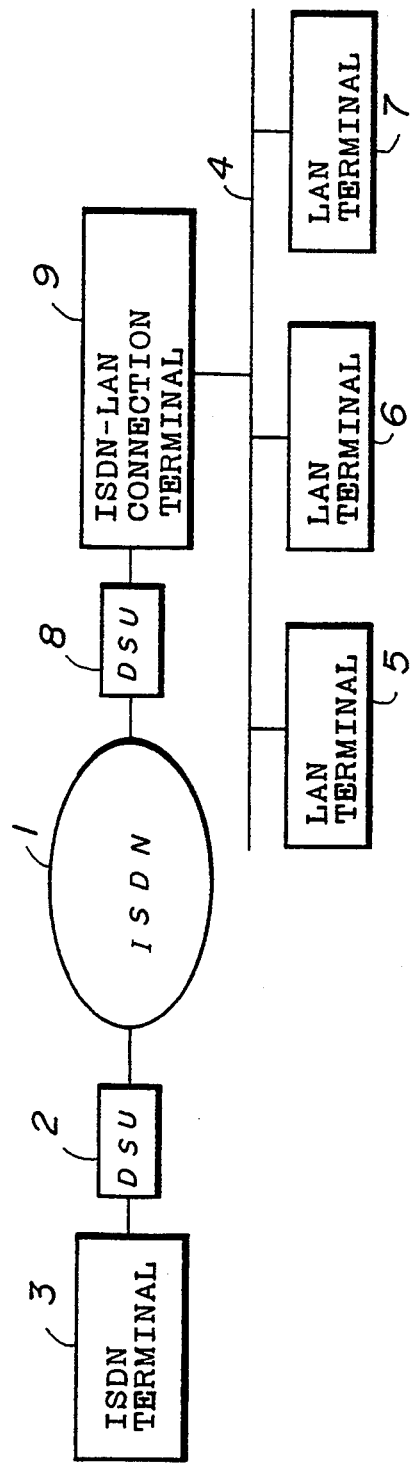
FIG. 1 shows a composition of a network of the ISDN and the LAN to which a first process for connecting the ISDN and the LAN to each other of the present invention has been applied.

FIG.1 shows the composition of a network of the ISDN and the LAN to which a first connection process for connecting the ISDN and the LAN to each other of the present invention has been applied. An ISDN 1 has a plurality of terminals connected to the same communications network. An ISDN terminal 3 is connected to the ISDN 1 via a network end terminal apparatus 2. In addition, an ISDN-LAN connection terminal 9 is connected to the ISDN 1 via a network end terminal apparatus 8. LAN terminals 5–7 are connected to the ISDN-LAN connection terminal 9 via the LAN 4.

Figure 2A:
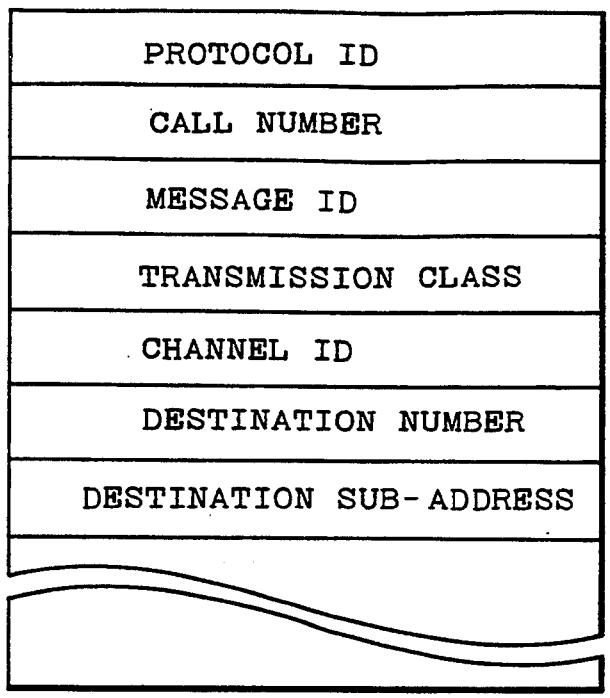
FIGS. 2A and 2B show examples of a transmission frame of the present invention.

The ISDN 1 executes communication processing procedures by a D-channel protocol, which has a 16 kbit/sec bit rate for the basic interface of the ISDN, between the ISDN terminal 3 and the ISDN 1 via the network end terminal apparatus 2. The ISDN terminal 4 inputs sub-address data or user-user information which are transmitted by the D-channel protocol of the base interface of the ISDN. The sub-address data and user-user information are transmitted as one frame of SETUP signals shown in FIGS. 2A and 2B. The SETUP signal in FIG. 2 (A) includes a PROTOCOL ID (protocol identifier), CALL NUMBER, MESSAGE ID (message type), TRANSMISSION CLASS (communication capacity), CHANNEL ID, DESTINATION NUMBER, DESTINATION SUB-ADDRESS and the like.

Figure 2B:
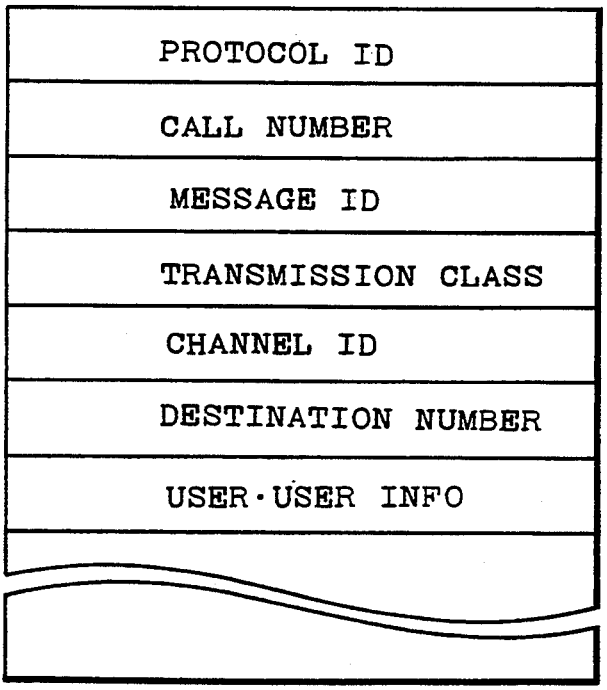

The SETUP signal in FIG. 2(B) includes a PROTOCOL ID, CALL NUMBER, MESSAGE ID, TRANSMISSION CLASS, CHANNEL ID, DESTINATION NUMBER, USER-USER INFORMATION and the like.

The contents of information elements of the user-user information are not checked by the network. These information elements are transferred transparently between terminals. The contents of the sub-address or the user-user information (identifier information) can have an internet address (such as 150, 180, 40, 8 or the like) which specifies the LAN terminals 5–7, an electronic mail address (such as abc, co, jp or the like) or a host name (such as sun1 or the like) input therein.

The LAN terminals 5–7 are allocated a physical address and an internet address on the basis of the IEEE standards mentioned above. The ISDN-LAN connection terminal 9 accumulates data which is transmitted from the ISDN terminal 3, or directly transmits the data to the LAN terminal which is specified by identification information of the sub-address data or the user-user information from the ISDN terminal 3.

FIG. 3 is a sequence chart showing the communications sequence for a first connection process for transmitting the data from the ISDN terminal to the LAN terminals by the sub-address data according to a first embodiment thereof. FIG. 3 shows that the ISDN-LAN connection terminal 9 does not have the data stored therein, and that the data is transmitted to the LAN terminals 5–7. The following are the steps for the communications sequence.

Step 30: The sub-address data is input as the transmission terminal specification information so that data can be sent by the operator of the ISDN terminal 3 to at least one of the LAN terminals 5–7.

Step 31: The ISDN terminal 3 then calls the ISDN 1, and connects a call to the ISDN 1.

Step 32: The ISDN 1 receives the call from the ISDN terminal 3 and calls the ISDN-LAN connection terminal 9 by a D-channel protocol.

Step 33: When the ISDN-LAN connection terminal 9 receives the call from the ISDN 1, the ISDN-LAN connection terminal 9 extracts the sub-address data which is appended inside the SETUP signal, as call setting signals which are transmitted on the basis of the D-channel protocol.

Step 34: The ISDN-LAN connection terminal 9 refers to the address information of the identification information of the sub-address in the SETUP signal. The address information has one of the internet address, the electric mail address and the host name. Accordingly, the ISDN-LAN connection terminal 9 specifies the LAN terminal by the address information.

Step 35: The ISDN-LAN connection terminal 9 is connected with at least the specified one of the LAN terminal 5-7 by the address information in the SETUP signal.

Step 36: The ISDN-LAN connection terminal 9 transmits the data from the ISDN terminal 3 to the LAN terminals 5-7 via the ISDN 1.

Step 37: The ISDN-LAN connection terminal 9 transmits the data received from the ISDN terminal 3 to at least the specified one of the LAN terminals 5-7 via the LAN 4.

Step 38: The LAN terminals 5-7 and the ISDN-LAN connection terminal 9 are disconnected from each other. The ISDN-LAN connection terminal 9 and the ISDN 1 are disconnected from each other. The ISDN 1 and the ISDN terminal 3 are disconnected from each other.

If the identification information which is appended to the sub-address data is specified by an internet address or a host name at the time that the data transfer takes place in steps 36, 37, NFS (Network File Protocol), which is the protocol for the transfer of files between terminals, and FTP (File Transfer Protocol), which is the protocol for the transfer of files between networks are execute between the ISDN-LAN connection terminal 9 and the LAN terminals 5-7. In addition, when the identification information of the sub-address data is an electronic mail address, is an electronic mail protocol is executed between the ISDN-LAN connection terminal 9 and the LAN terminals 5-7.

Figure 4:
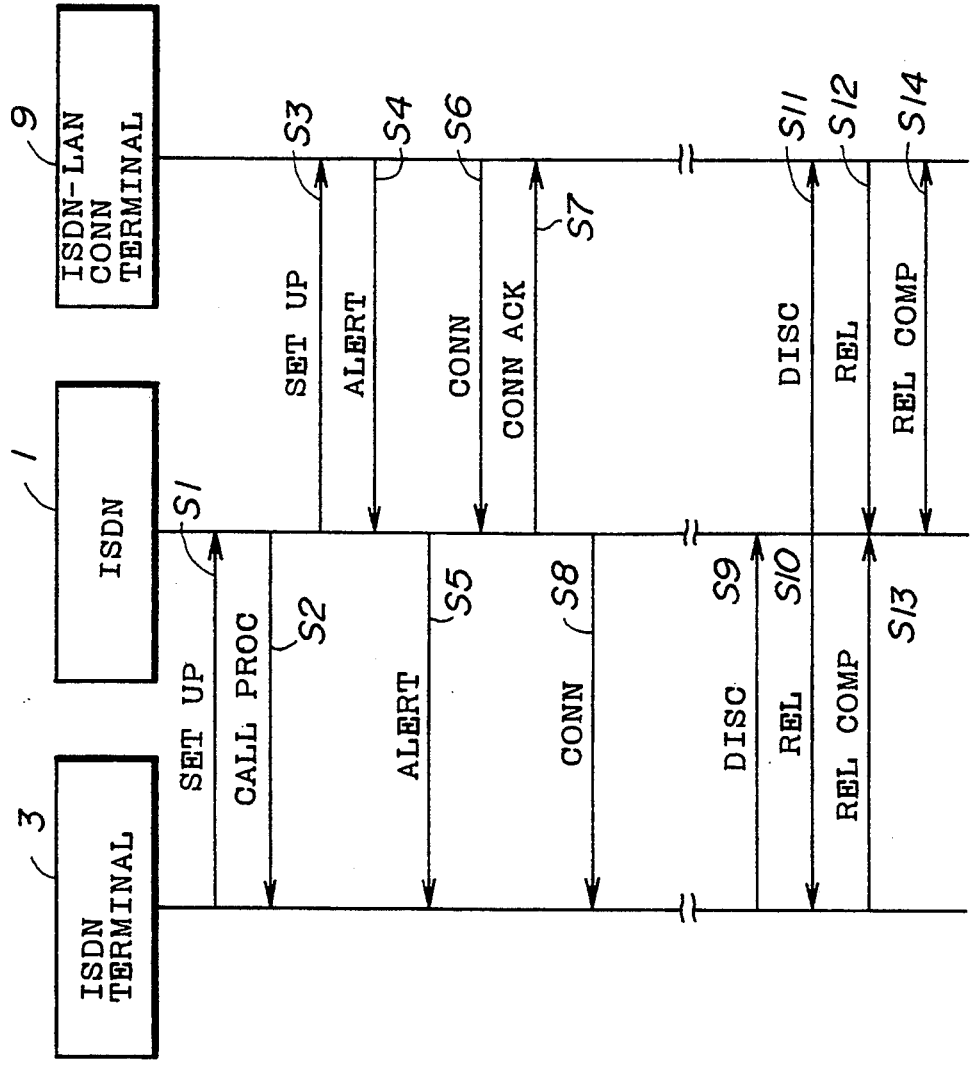
FIG. 4 is a sequence chart showing the outline of a communications sequence between a ISDN terminal and a ISDN-LAN connection terminal of the present invention.

FIG. 4 is a sequence chart showing the outline of a communications sequence between an ISDN terminal 3 and the ISDN-LAN connection terminal 9. The following are the steps for the communications sequence:

Step 1: The ISDN terminal 3 transmits the "SETUP" signal indicating a call setup requirement to the ISDN 1.

Step 2: The ISDN 1 transmits a "CALL PROC" signal indicating the completion of the notice of the call set up received from the ISDN-LAN connection terminal 9.

Step 3: The ISDN 1 transmits the "SETUP" signal indicating the call set up requirement to the ISDN-LAN connection terminal 9.

Step 4: The ISDN-LAN connection terminal 9 transmits an "ALERT" signal indicating the during call notice sent to the ISDN 1.

Step 5: The ISDN 1 transmits the "ALERT" signal indicating the during call notice sent to the ISDN terminal 3.

Step 6: The ISDN-LAN connection terminal 9 transmits a "CONN" signal indicating the call receiving notice sent to the ISDN 1.

Step 7: The ISDN 1 transmits a "CONN ACK" signal indicating the response confirmation notice corresponding to the "CONN" signal sent to the LAN terminals 5-7.

Step 8: The ISDN 1 transmits the "CONN" signal indicating the call receiving notice sent to the ISDN terminal 3.

Step 9: The ISDN terminal 3 transmits a "DISC" signal for indicating the requirement for disconnecting the ISDN 1 from ISDN terminal 3.

Step 10: The ISDN 1 transmits a "REL" signal indicating the call releasing requirement to the ISDN terminal 3.

Step 11: The ISDN 1 transmits the "DISC" signal indicating the disconnecting requirement to the ISDN-LAN connection terminal 9.

Step 12: The ISDN-LAN connection terminal 9 transmits the "REL" signal indicating the call number releasing requirement to the ISDN 1.

Step 13: The IDSN terminal 3 transmits a "REL COMP" signal indicating the call releasing notice sent to the ISDN 1.

Step 14: The ISDN-LAN connecting terminal 9 transmits the "REL COMP" signal indicating the call releasing notice sent to the ISDN 1.

The step 11, step 12, step 15 and step 18 of the communications sequence shown in FIG. 4 are D-channel protocol for connecting the ISDN terminal 3 and the ISDN 1 to each other, and correspond with the step 31 in FIG. 3. Further more, the step 3, step 4, step 6 and step 7 are D-channel protocol for connecting the ISDN 1 and the ISDN-LAN connection terminal 9 to each other, and correspond with the step 32 in FIG. 3.

The following is a description of a second connection process of the present invention according to the first embodiment thereof.

Figure 5:
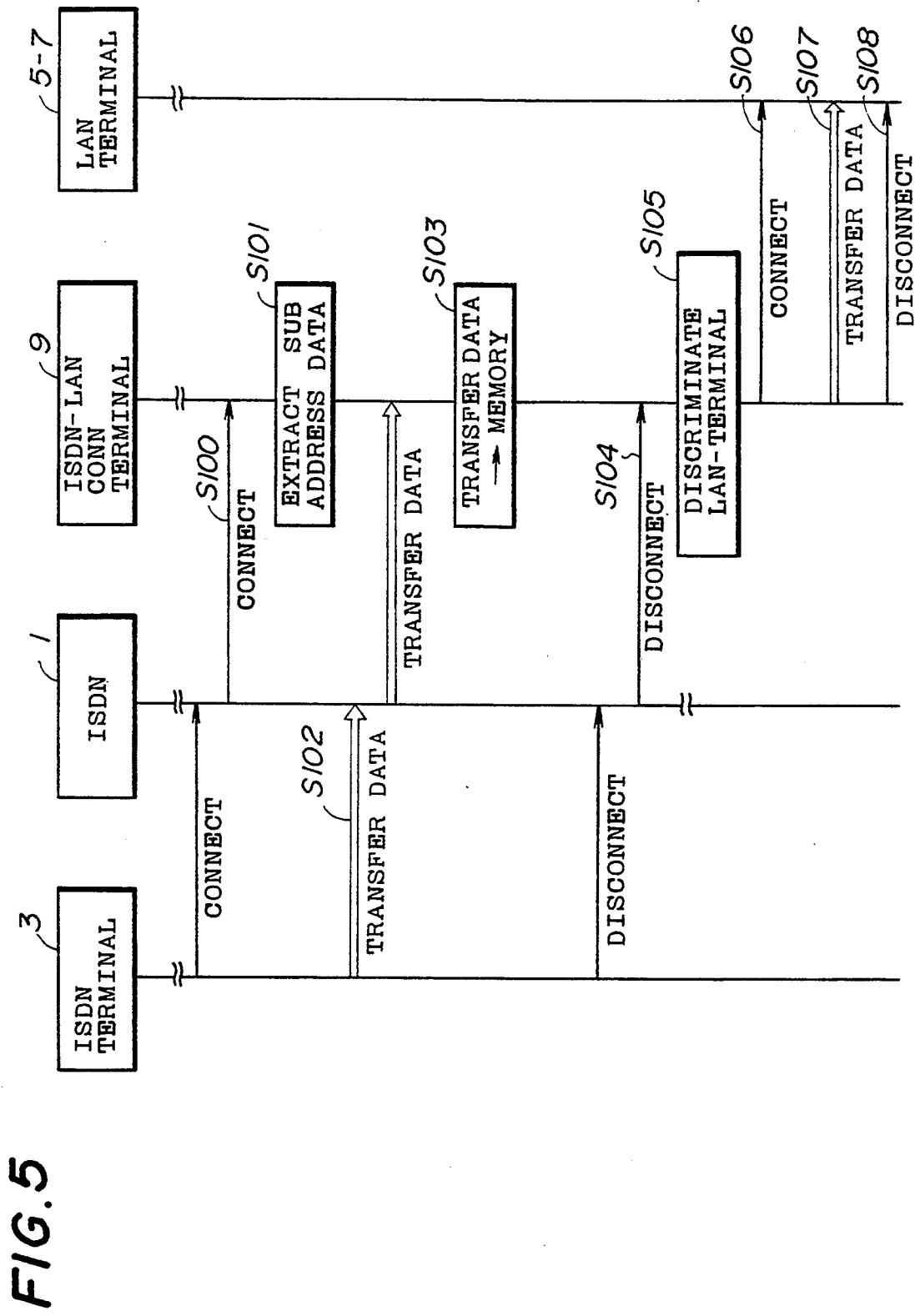
FIG. 5 is a sequence chart showing a communications sequence of a second connection process for connecting the ISDN and LAN to each other of the present invention according to the first embodiment thereof.

FIG. 5 shows a communications sequence for the connection process for the other case when the LAN terminals 5-7 have been specified by sub-address data. The D-channel protocol not shown in FIG. 5. This FIG show that the data which is received from the ISDN 1 is stored once in a memory in the ISDN-LAN connection terminal 9, and then transferred to the LAN terminals 5-7 via the LAN 4.

First, the operator of the ISDN terminal inputs the sub-address data for specifying at least one of the LAN terminals 5-7 to the ISDN terminal. Then the following steps for the communications sequence are performed:

Step 100: The ISDN 1 receives a call from the ISDN terminal 3 requesting a call connection to the ISDN-LAN connection terminal 9 by the D-channel protocol. Then, the ISDN-LAN connection terminal 9 receives the SETUP signal from the ISDN 1, and then the ISDN-LAN connection terminal 9 is connected with the ISDN 1.

Step 101: The ISDN-LAN connection terminal 9 extracts the identification information in the sub-address data in the SETUP signal which is transmitted to the ISDN-LAN connection terminal 9 from the ISDN 1 from the ISDN terminal 3 according to the D-channel protocol.

Step 102: The ISDN terminal 3 transmits the data to the ISDN 1.

Step 103: The ISDN 1 transmits the data to the ISDN-LAN connection terminal 9. The ISDN-LAN connection terminal 9 stores in its memory the data received from the ISDN terminal 3 via the ISDN 1.

Step 104: After the ISDN-LAN connection terminal 9 has received and stored the data, the ISDN terminal 3 executes a line disconnecting sequence by the D-channel protocol, thus disconnecting the line connecting the terminal 3 with the ISDN 1. The ISDN 1 executes the line disconnecting sequence by the D-channel protocol, thus disconnecting the line connecting the ISDN 1 with the ISDN-LAN connection terminal 9.

Step 105: The ISDN-LAN connection terminal 9 retrieves the address information in the identification information and specifies the LAN terminal corresponding to the address information in the sub-address data. The identification information is internet address information, electronic mail information, host identification information or some other kind of identification information.

Step 106: The ISDN-LAN terminal 9 is connected with the specified LAN terminal.

Step 107: The ISDN-LAN terminal 9 reads out the data from its memory and then transmits the data to the specified LAN terminal.

Step 108: The line between the ISDN-LAN connection terminal 9 and at least one of the LAN terminals 5-7 is disconnected.

As has been described above, by connecting the ISDN 1 and the ISDN-LAN connection terminal 9, which is connected to at least one of the plurality of LAN terminals 5-7 to each other, the ISDN-LAN connection terminal 9 can refer to the identification information in the sub-address which is received from the ISDN terminal 3 by means of the ISDN communications control sequence. The identification information is internet address information, electronic mail information or host identification information or some other type of identification information. The ISDN-LAN connection terminal 9 specifies at least one of the LAN terminals 5-7 according to the contents of the identification information. Accordingly, it is possible for the ISDN terminal 3 to easily specify LAN terminals 5-7.

The following is a description of a first connection process of the present invention according to a second embodiment thereof. The second embodiment performs a connection processing in the case where the LAN terminals 5-7 are specified by the identification information appended to the user-user information.

Figure 6:
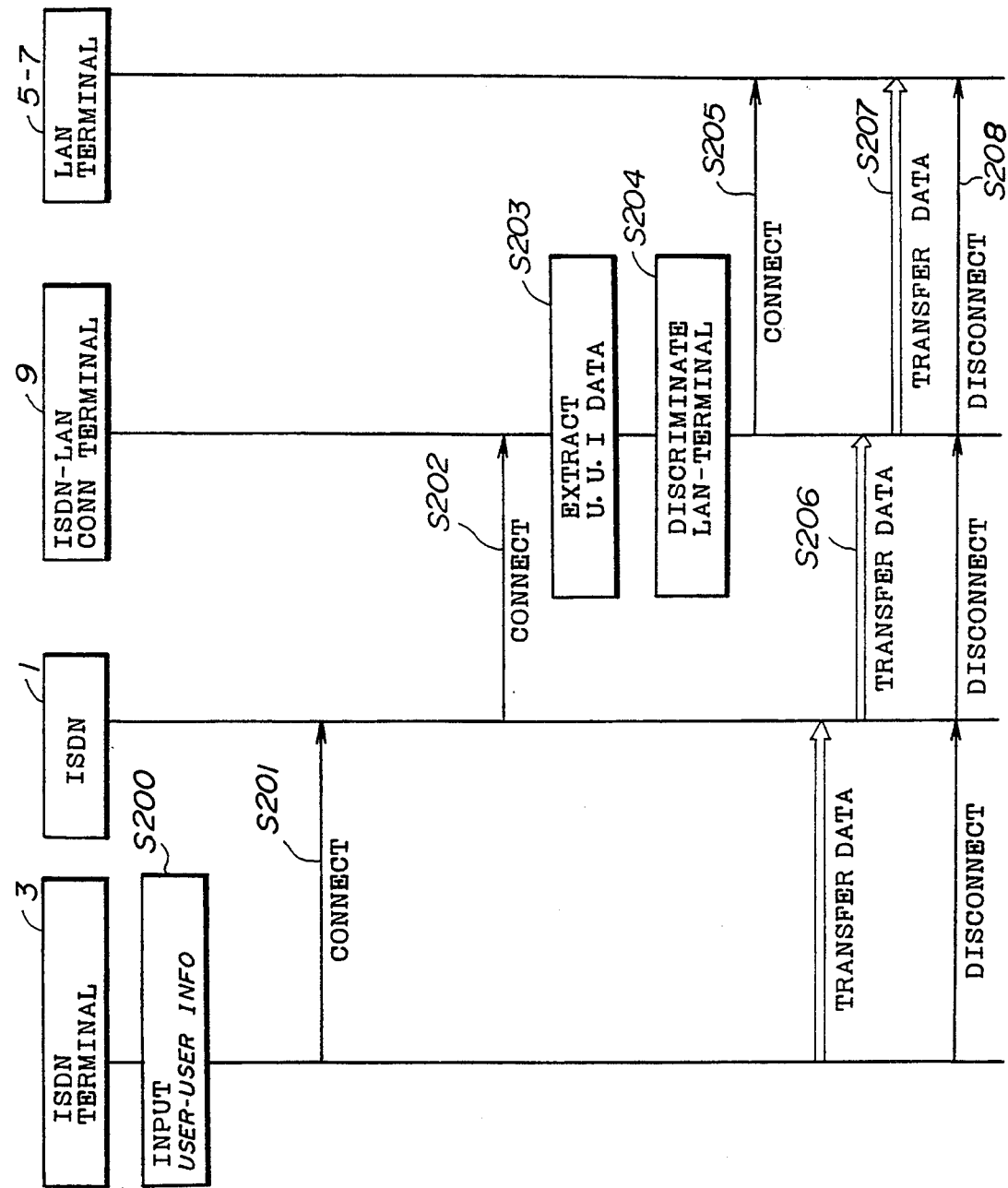
FIG. 6 is a sequence chart showing a communications sequence for a first connection process for connecting the ISDN and LAN to each other of the present invention according to the first embodiment thereof.

FIG. 6 shows a communications sequence for the connection processing for the case where the LAN terminals 5-7 have been specified by user-user information. The D-channel protocol is not shown in FIG. 6.

The following are the steps for the communication sequence:

Step 200: The sub-address data is input as transmission terminal specification information so that data can be sent by the operator of the ISDN terminal 3 to at least a specified one of the LAN terminals 5-7.

Step 201: The ISDN terminal 3 then calls the ISDN 1, and then the terminal 3 is connects to the ISDN 1.

Step 202: The ISDN 1 receives the call from the ISDN terminal 3 and then calls the ISDN-LAN connection terminal 9 by the D-channel protocol.

Step 203: When the ISDN-LAN connection terminal 9 receives the call, the ISDN-LAN connection terminal 9 extracts the sub-address data, which is appended inside the SETUP signal, as call setting signals which are transmitted on the basis of the D-channel protocol.

Step 204: The ISDN-LAN connection terminal 9 refers to the address information in the identification information of the sub-address in the SETUP signal.

The identification information is internet address information, electronic mail information, host identification or some other type of identification information. Accordingly, the ISDN-LAN connection terminal 9 specifies the LAN terminal by means of the address information.

Step 205: The ISDN-LAN connection terminal 9 is connected with at least the specified one of the LAN terminals 5-7 by means of the address information in the SETUP signal.

Step 206: The ISDN-LAN connection terminal 9 transmits the data from the ISDN terminal 3 to the LAN terminal 5-7 via the ISDN 1.

Step 207: The ISDN-LAN connection terminal 9 transmits the data received from the ISDN terminal 3 to at least the specified one of the LAN terminals 5-7 via the LAN 4.

Step 208: The line between the LAN terminals 5-7 and the ISDN-LAN connection terminal 9 is disconnected. The line between the ISDN-LAN connection terminal 9 and the ISDN 1 is disconnected. The connection between the ISDN 1 and the ISDN terminal 3 is disconnected. Then, the line is released from connection.

Figure 7:
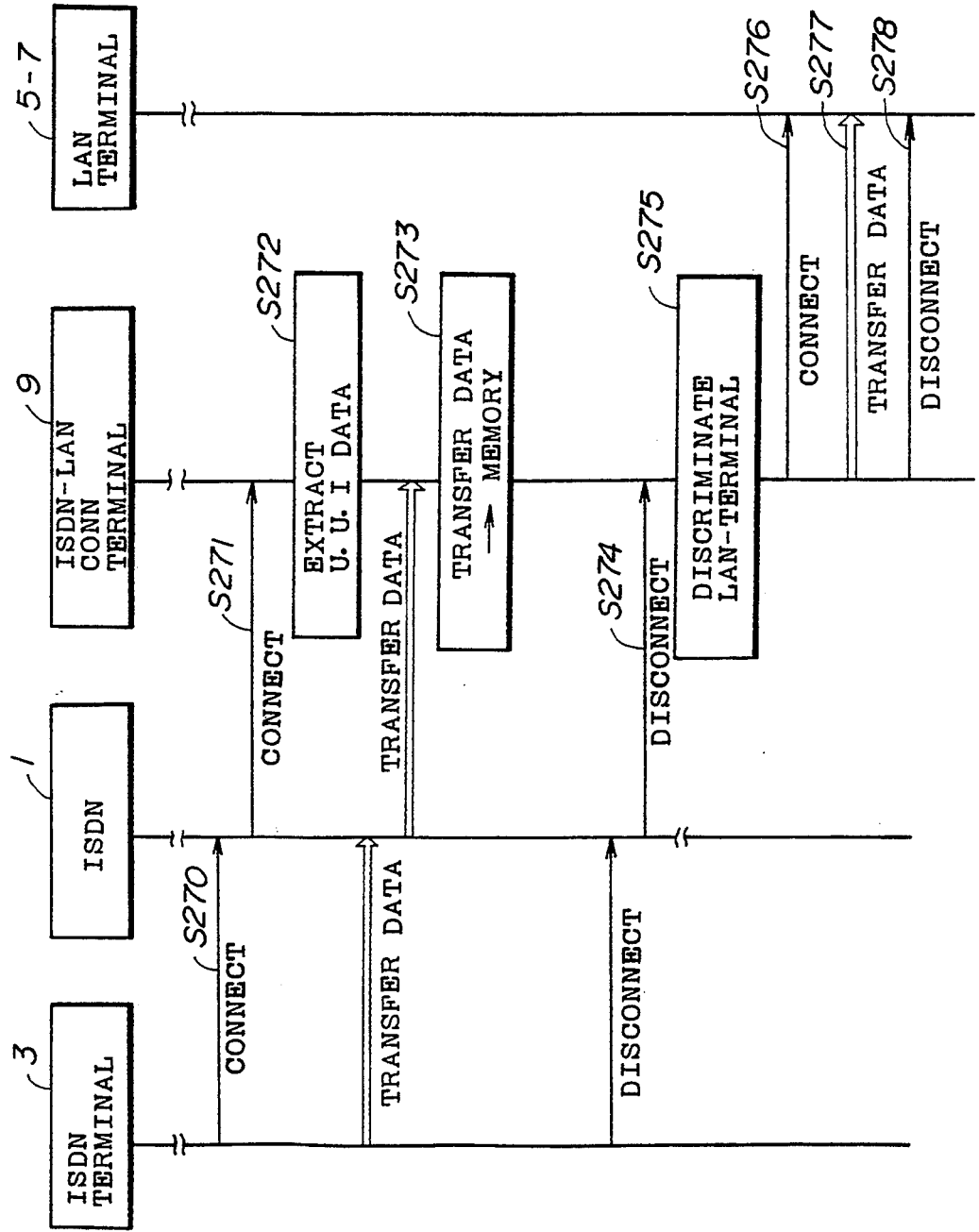
FIG. 7 is a sequence chart showing a communications sequence for a second connection process for the present invention according to the second embodiment thereof.

FIG. 7 shows a communications sequence for a second connection process of the present invention according to the second embodiment thereof in the case where the LAN terminals 5-7 have been specified by user-user data. The D-channel protocol is not shown in FIG. 7. In this FIG shows that the data which is received from the ISDN 1 is stored once in a memory in the ISDN-LAN connection terminal 9 and then transferred to the LAN terminals 5-7 via the LAN 4.

First, the operator of the ISDN terminal 3 inputs the user-user information for specifying any of the LAN terminal 5-7 from the ISDN terminal.

Then the following steps for the communications sequence are performed.

Step 270: The ISDN 1 receives a call from the ISDN terminal 3 and then requests a call connection to the ISDN-LAN connection terminal 9 by the D-channel protocol. Then, the ISDN-LAN connection terminal 9 receives the SETUP signal from the ISDN 1, and then the terminal 9 is connected with the ISDN 1.

Step 271: The ISDN-LAN connection terminal 9 extracts the identification information in the user-user information in the SETUP signal which is transmitted to the ISDN-LAN connection terminal 9 from the ISDN 1 from the ISDN terminal 3 according to the D-channel protocol.

Step 272: The ISDN terminal 3 transmits the data to the ISDN 1.

Step 273: The ISDN 1 transmits the data to the ISDN-LAN connection terminal 9. The ISDN-LAN connection terminal 9 stores in its memory the data received from the ISDN terminal via the ISDN 1.

Step 274: After the ISDN-LAN connection terminal 9 has received and stored the data, the ISDN terminal 3 executes a line disconnecting sequence by the D-channel protocol, thus disconnecting the line connecting the terminal 3 with the ISDN 1. The ISDN 1 executes the line disconnecting sequence by the D-channel protocol, thus disconnecting the line connecting the ISDN 1 with the ISDN-LAN connection terminal 9.

Step 275: The ISDN-LAN connection terminal 9 retrieves the address information of the identification information and specifies the LAN terminal corresponding to the address information. The identification information is internet address information, electric mail information host identification information or some other kind of identification information.

Step 276: The ISDN-LAN terminal 9 is connected with the specified LAN terminal.

Step 277: The ISDN-LAN terminal 9 reads out the data from the memory and then transmits the data to the specified LAN terminal corresponding to the address information in the user-user information.

Step 278: The line between the ISDN-LAN connection terminal 9 and at least one of the LAN 5-7 terminals is disconnected.

In this manner as described above, the present invention that the ISDN terminal 3 which is connected to the ISDN 1 specifies at least one of the LAN terminals 5-7 which is the transmission destination of the data transmitted from the ISDN terminal 3 via the ISDN 1. An internet address, electronic mail address or host name or the like is input to the sub-address or the user-user information. By means of the above, the data from the ISDN terminal 3 is transmitted to the LAN terminals 5-7 at the transmission destination when the LAN 4 and the ISDN 1 are connected to each other.

Accordingly, the present invention facilitates connecting of the ISDN 1 to the specified LAN terminal to each other.

Moreover, in the embodiment described above, the ISDN 1 is connected to only one ISDN terminal 3 but the composition is not limited to this embodiment, as it is possible to connect the ISDN 1 to a plurality of ISDN terminals, and for a LAN terminal to be specified by each of the ISDN terminals.

Figure 8:
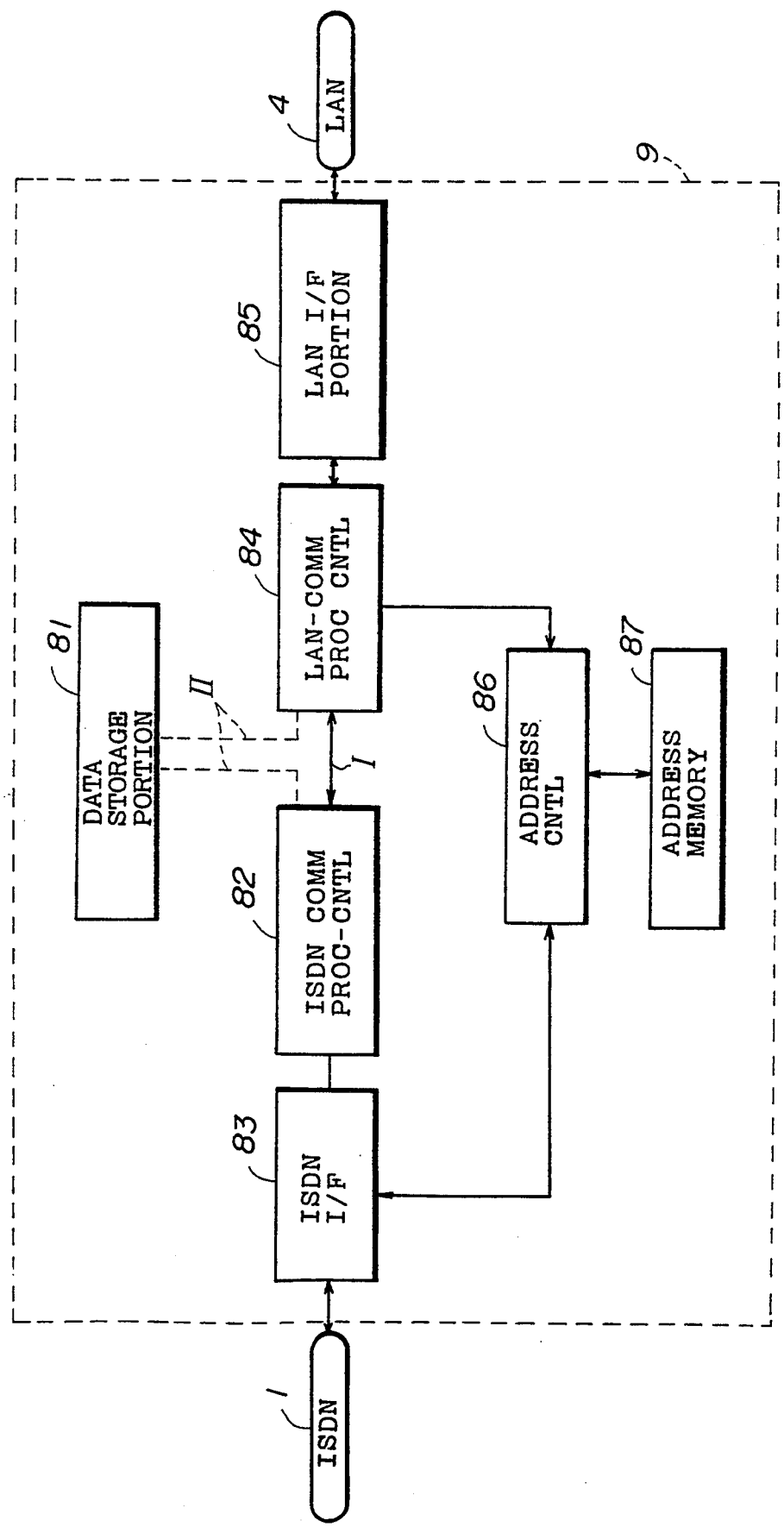
FIG. 8 shows a composition of an ISDN-LAN connection apparatus of the present invention.

The following is a description of a ISDN-LAN connection terminal apparatus , the ISDN-LAN connection terminal 9. FIG. 8 shows the configuration of the ISDN-LAN connection terminal.

The ISDN-LAN connection terminal apparatus comprises a data storage portion 81, an ISDN data communications procedure control portion 82, an ISDN interface portion 83, a LAN data communications procedure control portion 84, a LAN interface portion 85, an address control portion 86 and an address storage portion 87.

The ISDN interface portion 83 appends identification information for specifying the LAN terminals to the sub-address data or the user-user information. The ISDN interface portion 83 connects a call connection between the ISDN terminals 3 in accordance with the ISDN communications control procedure.

The data storage portion 81 stores the data which is transferred from the ISDN terminal 3 via the ISDN 1. The data that is stored in the data storage portion 81 is transmitted to at least one of the LAN terminals 5-7 on the basis of the identification information when the ISDN-LAN connection terminal apparatus and at least said one of the LAN terminals 5-7 are connected to each other.

When at least the specified one of the LAN terminals 5-7 is identified by the identification information, the data is transmitted to the specified one of the LAN terminals 5-7 and when the ISDN-LAN connection terminal 9 is connected, the LAN data communication procedure control portion 84 transmits the data to the ISDN-LAN connection terminal 9 via the ISDN 1. Furthermore, if the data storage portion 81 has the data stored therein, the LAN data communications procedure control portion 84 reads out the data from the data storage portion 81, and then transmits the data to the specified one of the LAN terminals 5-7 via the LAN interface portion 85.

The address storage portion 87 has the electric mail address, the internet address and the host address of the LAN terminal stored in an address table therein. The address control portion 86 receives the identification information in the sub-address data or the identification information in the user-user information of the SETUP signal from the ISDN terminal 3, and matches the predetermined has address table with the identification information.

The following is a description of operations carried out by the ISDN-LAN connection apparatus as the ISDN-LAN connection terminal 9.

The address control portion 86 of the ISDN-LAN connection terminal 9 performs the call setting (SETUP) from the ISDN 1 and receives the call setting message via the ISDN interface portion 83. The address control portion 86 extracts the sub-address data or the user-user information in the call setting message. Accordingly, the sub-address or the user-user address of the call setting message includes the internet address, the electric mail address or the host name for specifying the LAN terminal as the identification information. The address control portion 86 search the received sub-address data of the LAN terminal and the address table of the LAN terminal which has the address storage portion 87 stored therein, and performs address conversion which converts the electric mail address and the host name i.e, the character data, to the physical address. The LAN data communication procedure control portion 84 is connected with the LAN terminal according to the address which is the physical address of the specified LAN terminal.

A route I in FIG. 8 is used when the ISDN terminal 3 and the LAN terminals 5-7 are connected each other, and the data is transmitted from the ISDN terminal 3 to the LAN terminal 5-7 via the ISDN terminal and the ISDN-LAN connection terminal 9 (FIG. 3, FIG. 6). A route II in FIG. 8 designates that the data storage portion 81 has once stored therein the data from the ISDN terminal 3, and that the data stored in the data storage portion 81 has been transferred to the LAN data communication procedure control portion 84 after the data has been transferred to the ISDN-LAN connection terminal 9 and the LAN terminal 5-7. Then the data is transmitted to the LAN terminals 5-7 via the LAN interface portion 85 by the LAN data communications procedure control portion 84.

As has been described above, the ISDN-LAN connection terminal 9 extracts the identification information of the LAN terminal, which data has been transmitted from the ISDN 1, connects the ISDN 1 and the LAN terminal specified by that identification information to each other, and transmits the data from the ISDN terminal 3 to the LAN terminal 5-7.

Moreover, in the example as shown in FIG. 5 the case where identification information was appended to the sub-address data was described, but this information can also be appended to the user-user information.

Further, the present invention is not limited to these embodiments, as various variations and modifications may be made without departing from the scope of the present invention.

What is claimed is:

1. A method for transmitting data from an ISDN terminal in an ISDN to a LAN terminal in a LAN, through an intermediate device, comprising the steps of:

establishing a connection between the ISDN terminal and the intermediate device;

transmitting, by the ISDN terminal to the intermediate device after the connection has been established between the ISDN terminal and the intermediate terminal, first information containing address information of the intermediate device in a first field, and second information containing address information of the LAN terminal in a second field different from the first field;

receiving, by the intermediate device, the first and second information transmitted by the ISDN terminal;

transmitting by the intermediated device, information corresponding to the second information containing address information of the LAN terminal to the LAN terminal;

transmitting third information, by the ISDN terminal, to the intermediate device;

disconnecting the connection between the ISDN terminal and the intermediate device; and transmitting the third information from the intermediate device to the LAN terminal, after the connection between the ISDN terminal and the intermediate device has been disconnected.

2. A method according to claim 1, wherein said second information transmitted by the ISDN terminal is user-user information which is not examined by the ISDN.

3. A method according to claim 1, wherein said transmitting by the ISDN terminal transmits the second information to include an internet address of said LAN terminal.

4. A method according to claim 1, wherein said transmitting by the ISDN terminal transmits the second information to include electric mail address information of said LAN terminal.

5. A method according to claim 1, wherein said transmitting by the ISDN terminal transmits the second information to include host name information of the LAN terminal.

6. A method according to claim 1, further comprising the step:

storing the third information, by the intermediate device, before the third information is transmitted to the LAN terminal.

7. A method for transmitting data from an ISDN terminal in an ISDN to a LAN terminal in a LAN, through an intermediate device, comprising the steps of:

establishing a connection between the ISDN terminal and the intermediate device;

transmitting, by the ISDN terminal to the intermediate device after the connection has been established between the ISDN terminal and the intermediate terminal, first information containing address information of the intermediate device in a first field, and second information containing address information of the LAN terminal as user-user data in a second field different from the first field;

receiving, by the intermediate device, the first and second information transmitted by the ISDN terminal;

transmitting by the intermediated device, information corresponding to the second information containing address information of the LAN terminal to the LAN terminal;

transmitting third information, by the ISDN terminal, to the intermediate device;

disconnecting the connection between the ISDN terminal and the intermediate device; and transmitting the third information from the intermediate device to the LAN terminal, after the connection between the ISDN terminal and the intermediate device has been disconnected.

8. A method according to claim 7, wherein said transmitting by the ISDN terminal transmits the second information to include an internet address of said LAN terminal.

9. A method according to claim 7, wherein said transmitting by the ISDN terminal transmits the second information to include electric mail address information of said LAN terminal.

10. A method according to claim 7, wherein said transmitting by the ISDN terminal transmits the second information to include host name information of the LAN terminal.

11. A method according to claim 7, further comprising the step:

storing the third information by the intermediate device, before the third information is transmitted to the LAN terminal.

12. An apparatus for connecting an ISDN to a LAN, comprising:

means for establishing a connection to an ISDN terminal of the ISDN;

means for receiving ISDN communications control information having first address information in a first field and second address information in a second field different from the first field, transmitted by the ISDN terminal over said ISDN;

means for extracting the second address information from the received ISDN communications control information;

means for generating LAN data containing address information corresponding to said second address information;

means for disconnecting the connection to the ISDN terminal; and means for transmitting said generated LAN data to the LAN, after said means for disconnecting disconnects the connection to the ISDN terminal.

13. An apparatus according to claim 12, wherein said means for receiving ISDN communications control information receives the second address information as sub-address data which contains an internet address, electronic mail address, and a host name.

14. A method according to claim 12, wherein said means for receiving ISDN communications control information receives said second address information as user-user information.

* * * * *